May 20, 1930. H. GROB 1,759,784
MEANS FOR TRANSMITTING ENERGY BETWEEN SHAFTS
Filed July 24, 1925
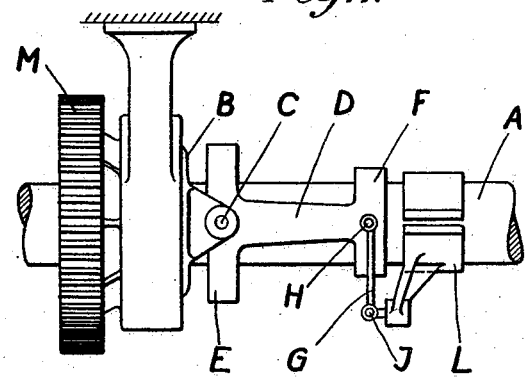
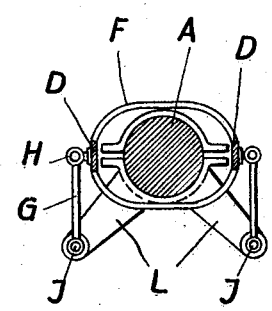
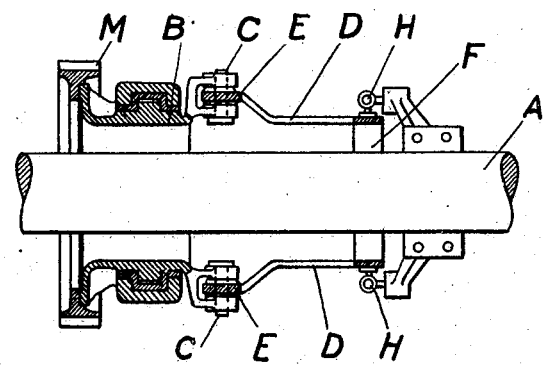

Patented May 20, 1930

1,759,784

UNITED STATES PATENT OFFICE

HUGO GROB, OF BERLIN, GERMANY, ASSIGNOR TO NAAMLOOZE VENNOOTSCHAP MACHINERIEEN EN APPARATEN FABRIEKEN, OF UTRECHT, NETHERLANDS

MEANS FOR TRANSMITTING ENERGY BETWEEN SHAFTS

Application filed July 24, 1925, Serial No. 45,928, and in Germany July 24, 1924.

This invention relates to a means for transmitting energy.

It is generally admitted that one of the most reliable means for transmitting energy from one shaft to another consists in toothed gearing. The use of the latter, however, is accompanied by great difficulties if the relative positions of the two shafts are variable, as occurs, for example, in the case of the lighting dynamo of a car driven by the car axle, or in the case of electric locomotives. In this case an additional movable member is required intermediate of the two shafts, transmitting the force from the one shaft to the other.

A basic and already known embodiment of such an intermediate member is characterized by the fact that the same is capable of being displaced both against the end of the one shaft as well as the end of the other shaft, in each case in a certain direction, these two directors being at right angles to each other.

If the intermediate member is composed of one single piece, the same must be capable of sliding motion in relation to each shaft end. If for the purpose of avoiding sliding motion journals are employed, it is necessary to make the intermediate member composed of two single parts, which are rotary, and are hinged on to each other and to the two shaft ends. In the case of all hitherto known couplings of this kind the journals about which the rotary parts are capable of oscillation are arranged parallel to the main shaft of the coupling, a fact which in many cases leads to undesirable dimensions in a radial direction.

Now the invention consists in the fact that the oscillatory motion of the one intermediate portion occurs about an axis which is at right angles to the axis of the shaft of the coupling. This results in the fact that the links, which engage with these journals, assume a position which is parallel to the shaft, i. e., require very little space in a radial direction; and furthermore that one pair of links may be dispensed with. As compared, therefore, with the hitherto known arrangements, the points of origin of force both as applied to the one as well as to the other shaft are situated in two different planes.

Fig. 1 shows one form of embodiment in elevation,

Fig. 2 is an end view, and

Fig. 3 a plan.

A represents one of the two shafts, in the case of the present example given the movable vehicle axle, from which the energy is transmitted to the hollow shaft B mounted in fixed manner on the vehicle frame. The shaft B possesses two symmetrically disposed journals or hinge pins C, upon which engages a ring E having two arms D. At the other ends the arms are again connected by means of a second, oval ring F, and carry two pins H engaging in the rods G. They are thus positively connected through the joint J with the double-armed support L firmly mounted on the axle A.

All rotary motion of the axle A is accordingly transmitted without play to the hollow shaft B by means of the double ring member F, D, E. For the purpose of further transmitting the force the hollow shaft may be connected at the other end with a gear wheel M, which for avoiding heavy transverse forces is preferably located as near as possible to the bearing plane.

The arrangement shown here is only capable of being used in practice if the force is also transmitted perfectly evenly in the case of axles which are relatively displaced to a great extent laterally, i. e., only if the angular velocity of the driven shaft exactly coincides at all times with that of the driving shaft. This is equivalent to the requirement for the hollow shaft to remain at rest in the case of stationary drive, if the other axle, without rotating, is displaced in the same manner as occurs later when running. Simple consideration will show that this actually is the case. In the same manner transverse forces do not occur in the bearing of the hollow shaft at any position.

What I claim is:

A device for transmitting energy between driving and driven rotary shafts, both shafts being substantially coaxial and mounted to permit lateral movement therebetween, comprising two links pivotally mounted to one of the shafts at one end of the links, a rigid intermediate member to which the other ends of the links are pivotally mounted, and means pivotally mounting the intermediate member to the other of said shafts, said means permitting movement of the intermediate member in a direction at right angles to the rotary shafts, and said two links being mounted to permit of relative lateral displacement of the two shafts in a direction which is vertical both to the axial direction of the shafts as well as to the direction of movement of the intermediate member.

In testimony whereof I have affixed my signature.

HUGO GROB.